United States Patent [19]

Kimura et al.

[11] Patent Number: 4,868,746

[45] Date of Patent: Sep. 19, 1989

[54] SIGNAL PROCESSING METHOD IN AUTORADIOGRAPHY

[75] Inventors: Tsutomu Kimura; Kazuhiro Hishinuma, both of Kanagawa, Japan

[73] Assignee: Fuji Photo Film Co., Ltd., Kanagawa, Japan

[21] Appl. No.: 568,875

[22] Filed: Jan. 6, 1984

[30] Foreign Application Priority Data

Jan. 8, 1983 [JP] Japan .................................. 58-1336

[51] Int. Cl.⁴ ........................ G01T 1/00; G01N 33/50; G01N 27/26; G21H 5/00
[52] U.S. Cl. .................................... 364/413.13; 382/6
[58] Field of Search ................... 364/413, 414; 382/6; 935/6, 76, 77; 436/169, 174

[56] References Cited

U.S. PATENT DOCUMENTS

| | | | |
|---|---|---|---|
| Re. 31,847 | 3/1985 | Luckey | 250/327.2 |
| 4,258,264 | 3/1981 | Kotera et al. | 250/459.1 X |
| 4,315,318 | 2/1982 | Kato et al. | 364/414 X |
| 4,320,415 | 3/1982 | Jones | 382/6 X |
| 4,389,670 | 6/1983 | Davidson et al. | 358/211 X |
| 4,496,973 | 1/1985 | Horikawa et al. | 364/414 X |
| 4,526,865 | 7/1985 | Silman | 435/803 |

FOREIGN PATENT DOCUMENTS 0738602 6/1980 U.S.S.R. ............................ 364/413

OTHER PUBLICATIONS

Sanger, F. et al., "DNA Sequencing with Chain-Terminating Inhibitors" Proc. Natl. Acad. Sci. U.S.A., vol. 74, No. 12, pp. 5463–5467, 12/1977.
Smith, L. et al., "Fluorescence Detection in Automated DNA Sequence Analysis", Nature, vol. #321, 6/12/1986, pp. 674–678.

*Primary Examiner*—Jerry Smith
*Assistant Examiner*—Charles B. Meyer
*Attorney, Agent, or Firm*—Gerald J. Ferguson, Jr.

[57] ABSTRACT

A signal processing method in autoradiography employing a radiosensitive material for the purpose of obtaining information on one dimensional location of radioactively labeled substances distributed in at least one dimensional direction on a support medium, in the form of symbol, numeral or combination thereof, comprising the steps of obtaining a digital signal corresponding to the autoradiograph on a radiosensitive material, by exposing said radiosensitive material to radiation emitted by said radioactively labeled substances on the support medium determining one dimensional scanning line relative to said digital signal; and detecting sampling points on said scanning line, comprising and identifying the positions of said sampling points detected on said scanning line among resolved rows for determining the base sequence of labeled substances.

11 Claims, 3 Drawing Sheets

SIGNAL PROCESSING METHOD IN AUTORADIOGRAPHY

BACKGROUND OF THE INVENTION

1. Field of the Invention

This invention relates to a signal processing method in autoradiography, and more particularly to a signal processing method in autoradiography employing a radiosensitive material.

2. Description of the Prior Art

Autoradiography has been known as a method for obtaining locational information or radioactively labeled substances distributed in at least one dimensional direction to form distributed rows on a support medium.

For instance, autoradiography comprises steps of; labeling organism-originating biopolymers such as proteins or nucleic acids with a radioactive element; resolving the radioactively labeled biopolymers, derivatives thereof, or cleavage products thereof on a gel support (support medium) through a resolving process such as gel electrophoresis; placing the gel support and a high-sensitivity type X-ray film together in layers for a certain period of time to expose said film, developing said film, obtaining the locational information of the radioactively labeled substances from the developed film, and then performing the identification of the polymeric substances, determination of molecular weight thereof and isolation thereof based on the obtained locational information.

Autoradiography has a prominent advantage in that visual observation of the locational information in a cell scale or a molecular scale on radioactively labeled substances can be made by utilizing the radiography as mentioned above. However, in other words, it is essential in the autoradiography utilizing the radiography to visualize the autoradiograph having the locational information on a radiographic film in order to obtain the locational information on the radioactively labeled substances.

In fact, the investigators have determined the distribution of the radioactively labeled substances in a sampled by observing a visualized autoradiograph with eyes to obtain the locational information on the specific substances labeled with a radioactive element.

A certain locational information as obtained above has been further subjected to various analyses to isolate or identify radioactively labeled substances, or to determine the molecular weight or characteristics of specific substances. For instance, the above-mentioned autoradiography is used effective to determine the base sequence of nucleic acids such as DNA, and the method is considered to be of a value for determination of structure of polymeric substances originating from organisms. The determination of structure of such substances likewise requires the visual determination.

Accordingly, the autoradiography is a useful method for analysis of the structure and function of tissue of organisms and/or of organism-originating substances, but it has unfavorable feature that the autoradiography requires visual analysis, thereby needing a great amount of time and labor.

Further, the locational information obtained by the analysis of the autoradiograph varies depending on the investigators in charge because of inherent unreliability of visual observation, and the accuracy of the information is limited to a certain extent. Particularly, in such a case that only a small quantity of a sample has been employed, that the intensity of radiation energy emitted by radioactively labeled substances has been low, or that the exposure has been done under unfavorable conditions, an autoradiographic image visualized on a radiographic material has reduced quality (in regard to sharpness, contrast, etc.) so that satisfactory information can not be obtained and the accuracy is low. These are drawbacks of the autoradiography.

In order to improve the accuracy of the locational information, for instance, a visualized autoradiograph can be scanned by means of a device such as a scanning densitometer. However, such scanning process requires increased time and complicated procedures.

SUMMARY OF THE INVENTION

It has been discovered that the information on one dimensional location of radioactively labeled substances is obtained in the form of symbol and/or numeral by a signal processing method. The signal processing comprises steps of obtaining a digital signal corresponding to the autoradiograph visualized on a radiosensitive material, which has the locational information on the radioactively labeled substances in a sample, and subsequently processing the digital signal.

The present invention provides a signal processing method in autoradiography for obtaining information on one dimensional location of radioactively labeled substances distributed in at least one dimensional direction on a support medium, in the form of symbol, numeral or combination thereof, which comprises a process including:

(1) determining one dimensional scanning line for signal processing; and (2) detecting sampling points on said scanning line, said processing being applied to digital signal corresponding to an autoradiograph having the locational information on the radioactively labeled substances, said digital signal being obtained by exposing a radiosensitive material to radiation emitted by said radioactively labeled substances on the support medium to record the autoradiography of the radioactively labeled substances on the radiosensitive material, and reading out said autoradiograph photoelectrically.

DETAILED DESCRIPTION OF THE INVENTION

Figure 1:
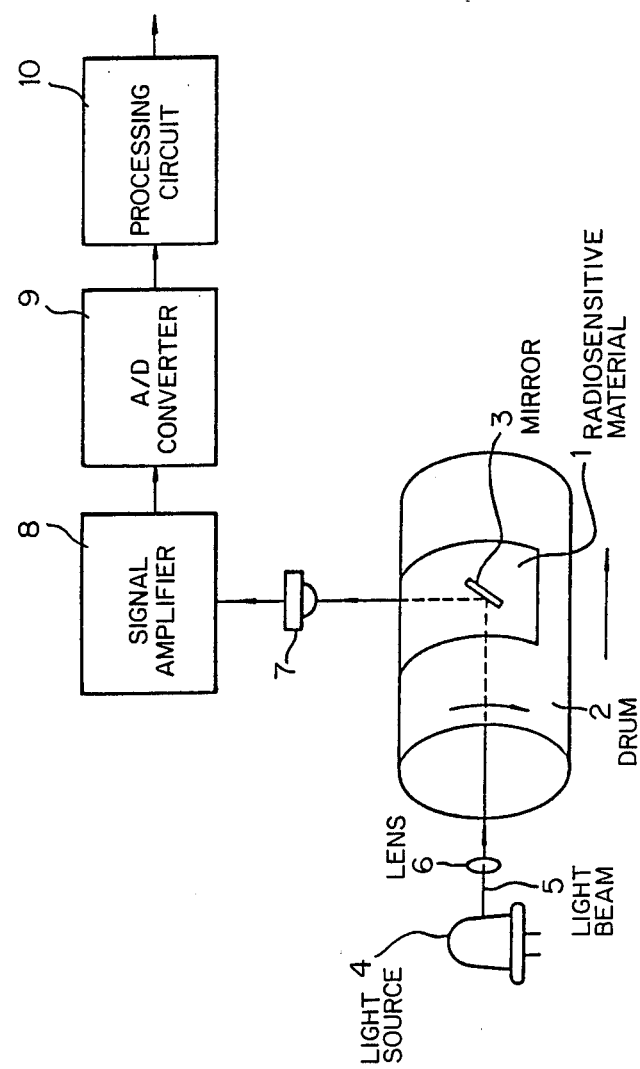
FIG. 1 shows an example of the read-out system for reading out an autoradiograph having locational information on the radioactively labeled substances in a sample recorded on a radiosensitive material employable in the present invention.

According to the present invention, in the step of photoelectrically reading out the autoradiography of an object visualized on a radiosensitive material, a digital signal which is hardly affected even if the level of density of the image on the radiosensitive material deviates depending upon variation of the exposure conditions brought about by variation of the conditions of the object and fluctuation of the speed of the radiographic emulsion (photographic emulsion), can be obtained by setting the read-out gain at an appropriate value.

Further, the digital signal having the locational information on the radioactively labeled substances is processed in an appropriate signal processing circuit having a function of signal processing to give automatically the locational information in the form of desired symbol and/or numeral. Thus, this method requires no visual observation. Optionally, the locational information represented by symbol and/or numeral can be further subjected to a suitable calculation or combined with other related information to obtain a desired information such as information concerning the structure or function of substance without any manual operation.

Accordingly, the analysis of the autoradiograph can be automated by applying thereto the present invention comprising subjecting the digital signal corresponding to the autoradiograph having the locational information on the radioactively labeled substances to the digital signal processing, so that the time and labor required in the radiography is reduced. Further, the locational information is obtained with high accuracy by the present invention.

Furthermore, the information on the relative amount of the radioactively labeled substances on respective positions such as concentration distribution thereof is also obtainable with high accuracy in addition to the information on one dimensional location thereof.

In the present invention, the term "locational information" of the radioactively labeled substances means to include a variety of information relating to the location of the radioactively labeled substances, or the aggregation thereof, being present in the sample, such as the location, the shape, the concentration, the distribution and combinations thereof.

Examples of the sample used in the present invention include a support medium on which radioactively labeled substances are resolved in one dimensional direction to form a resolved row. Examples of the radioactively labeled substances include biopolymers, derivatives thereof, or cleavage products thereof, being labeled with a radioactive element.

For instance, in the case that the radioactively labeled bipolymers are polymeric substances such as protein, nucelic acid, derivatives thereof and cleavage products thereof, the present invention is useful for isolation and identification thereof. Further, the present invention can be effectively used to analyze the whole or partial molecular structures of these bipolymers and the basic segmental constitutions thereof.

Representative examples of the method for resolving (or developing) the radioactively labeled substances on a support medium include an electrophoresis using one of various resolving mediums such as a gel in the form of layer, column or the like, a molded polymeric film such as a cellulose diacetate film, a filter paper, and a thin layer chromatography using a support of material such as silica gel. However, the method employable in the present invention is by no means restricted to these methods.

Samples employable in the present invention are by no means restricted to the above-mentioned samples, and any other samples can be used, provided that the sample is a support medium containing the radioactively labeled substances distributed one-dimensionally thereon and the autoradiograph having the locational information thereof can be visualized on the radiosensitive material.

The radiosensitive material used in the present invention has a basic structure comprising a support and a radiographic emulsion (photographic emulsion) layer. The radiographic emulsion layer comprises a binder such as gelatin and silver halide dispersed therein. For instance, the radiosensitive material is prepared by providing the above-mentioned emulsion layer onto the transparent support such as a polyethylene terephthalate sheet. A representative example of the radiosensitive material includes a radiographic film such as a high-speed type X-ray film.

In carrying out the exposing procedure, that is, the procedure of exposing the radiosensitive material to the radiation emitted from the support medium containing the radioactively labeled substances, at least a portion of the emitted radiation is absorbed by the radiosensitive substance in the radiosensitive material by placing the support medium and radiosensitive material together in layers for a certain period of time. The exposure can be accomplished by keeping the radiosensitive material in a position adjacent to the support medium, for instance, at a low temperature such as a temperature lower than 0° C. for at least several days, and then the radiosensitive material is developed. In the exposing procedure, it is further possible to enhance the radiographic speed of the radiosensitive material by using a radiographic intensifying screen or applying thereto a preliminary exposure such as flash exposure.

The exposing procedure of the radiosensitive material to a sample and the developing procedure thereof in the autoradiographic process have been well known, and are described for instance in the following literature: Method in Biochemical Experiment, Volume 6, Method in Tracer Experiment I, 271–289, "8. Autoradiography" by Toru Sueyoshi & Akiyo Shigematsu (Tokyo Kagaku Dozin Ltd., 1977).

A method for reading out or detecting the autoradiograph having the information on the one dimensional location of the radioactively labeled substances on the support medium recorded on the radiosensitive material according to the invention will be described briefly, referring to an embodiment of a read-out system shown in FIG. 1 of the accompanying drawings.

FIG. 1 schematically illustrates an embodiment of the read-out system for reading out the autoradiograph having one dimensional information on the location of the radioactively labeled substances, which is recorded in the form of a visual image on a radiosensitive material 1.

The radiosensitive material 1 on which the visual image is recorded is mounted on a transparent and hollow drum 2. The drum 2 is moved in the axial direction at a certain speed as well as rotated about its axis at a certain angular velocity and a mirror 3 is fixed in the hollow drum 2. A light beam 5 generated by a light source 4 passes through a lens 6 and enters the drum 2. The light beam is then reflected in the upper direction by the mirror 3 and passes through the radiosensitive material 1 mounted on the transparent drum 2. Thus, the radio-sensitive material 1 is spot-scanned with the light beam 5 in the X-Y scanning mode.

The light beam passing through each position of the radiosensitive material 1 is received by a light detector 7 and converted to an electric signal, which is amplified by an amplifier 8 and converted to a digital signal through an A/D converter 9.

More in detail, the read-out procedure is described in Japanese Patent Provisional Publications No 54(1979)-121043.

In the above description on the method for reading out the autoradiograph having the locational information on the radioactively labeled substances recorded on the radiosensitive material, a read-out procedure utilizes the light transmission method using a light beam, but the light reflection method can also be applied thereto. Further, the read-out procedure is by no means restricted to the above-mentioned embodiment, but other various methods such as a read-out procedure using a TV camera can be utilized.

The thus obtained digital signal corresponding to the autoradiograph of the radioactively labeled substances is subsequently input into a signal processing circuit 10 shown in FIG. 1. In the signal processing circuit 10, the digital signal is processed to give locational information on the radioactively labeled substances in the form of symbol and/or numeral. More in detail, a scanning line for the signal processing is determined and then sampling points on the scanning line are detected in the circuit 10.

The digital signal processing according to the present invention is described below, referring to an example of an autoradiograph of a resolved row obtained by resolving a mixture of radioactively labeled substances on a support medium through electrophoresis or the like.

Figure 2:
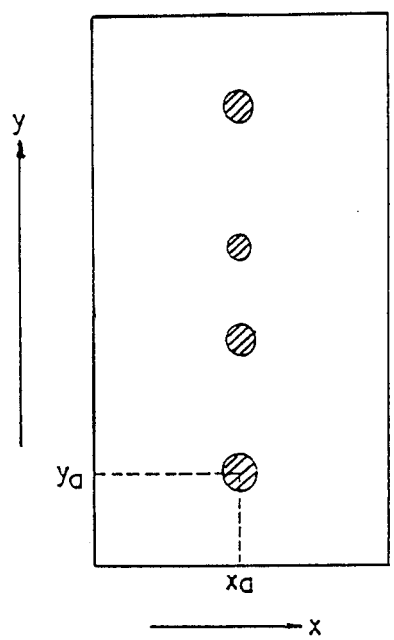
FIG. 2 shows an example of autoradiograph of a sample in which radioactively labeled substances are resolved in one dimensional direction.

FIG. 2 shows an example of the autoradiograph of a sample which comprises the support medium on which a plurality of radioactively labeled substances are resolved linearly in the longitudinal direction thereof. The digital signal obtained by applying the radiography and read-out method to the sample as described above, that is, the digital signal received by the signal processing circuit 10 shown in FIG. 1, is provided with an address (X, Y) which is represented by a coordinate system defined by the radiosensitive material and with a signal level (Z) in each address corresponding to the amount of the transmitting light. Accordingly, the digital signal corresponds to the autoradiograph shown in FIG. 2. In other words, the digital image data having the locational information on the above-mentioned radioactively labeled substances are given to the signal processing circuit 10. In the present invention, the term "digital image data" means a set of digital signals corresponding to the autoradiograph of the radioactively labeled substances.

In the first step for the processing, the scanning line for the digital signal processing is determined with respect to the above-mentioned digital signal. In FIG. 2, the scanning line can be determined, for instance, by the following manner in which the vertical direction (namely, resolving direction) is referred to as a Y-axis direction and the horizontal direction as an X-axis direction: the digital image data obtained as above are scanned numerically along the X-axis direction and X coordinate ($X_a$) at which the signal exhibits a maximum level is detected. The scanning along the X-axis direction can be done at any position along the Y-axis (for instance, at $Y = Y_a$), but the scanning is necessarily done in such a sufficient width as to cover at least one resolved band of the radioactively labeled substance.

In the signal processing method of the present invention, the digital signal obtained by photoelectrically reading out the visual image on the radiosensitive material such as a radiographic film is stored temporarily in a memory device of the signal processing circuit 10 (that is, stored in a non-volatile memory unit such as a buffer memory, a magnetic disk, etc.). In the signal processing, the scanning on the digital image data means to selectively pick up only the signal in the scanning area from the memory device.

Therefore, the X coordinate (X) can be detected, for instance, by repeatedly picking up digital signals within the above scanning area along the Y-axis, summing the levels of the picked digital signals for all X coordinate, and locating the position at which the sum of the signal levels is the highest. Alternatively, the X coordinate ($X_a$) can be detected by repeatedly picking up digital signals within the above scanning area along the X-axis, detecting an X coordinate at which the signal level is the highest for every Y coordinate, and determining the X coordinate through calculation of the average coordinate for all X coordinates. In order to remove noise peaks which are possibly picked up in the scanning in addition to the desired signals, the signal level may be made two-valued with a previously set threshold valve.

The straight line which passes through the X coordinate ($X_a$) detected as mentioned above and is parallel to the Y-axis is assigned to the scanning line for the signal processing procedure described below.

In the second step, sampling points on the scanning line are detected. All points at which the signal exhibits a maximum level detected in the course of picking up the digital signals on the scanning line can be assigned to the sampling points for detecting resolved bands (points) of the radioactively labeled substances. This scanning procedure along the scanning line is also desirably done with a certain width. Thus, the term "maximum points of the signal level" means all the peak points given in a graph in which the position (Y) is plotted along the abscissa (horizontal axis) and the mean value (Z) of the signal levels within the scanning width is plotted along ordinate (vertical axis). Hereinafter, the mean value of the signal level at each position (in each width) on the scanning line is simply referred to as the signal level at the position.

Figure 3:
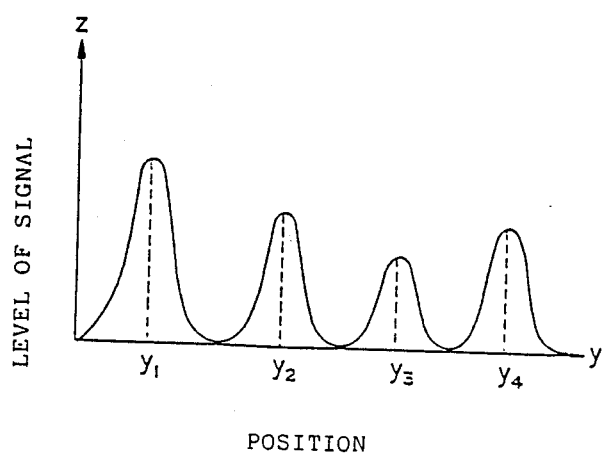
FIG. 3 graphically shows a typical relationship between the level of digital signal and the position along a scanning line for signal processing.

FIG. 3 shows a graph in which the position (Y) on the scanning line is given on abscissa and the signal level is given an ordinate.

As stated above, a sampling point $S_n$ having a coordinate and a signal level at its coordinate ($X_a$, $Y_n$, $Z_n$) is determined, wherein n is a positive integer and represents the number of each sampling point.

By applying the signal processing to the digital signal as described above, the information on one dimensional location of the radioactively labeled substances can be represented by a combination of the position in the one dimensional direction and the signal level at its position ($Y_n$, $Z_n$). The signal level ($Z_n$) at each position is assumed to indicate the relative amount (concentration) of the radioactively labeled substance.

Further, if the starting position for resolving the radioactively labeled substances is recorded previously on the radiosensitive material with a maker containing a radioactive element, the starting position ($Y_O$) can be detected on the digital image data in the same manner as described above. Otherwise, the starting position ($Y_O$) can be detected by beforehand providing the radiographic film itself with a mechanical identification means, such as, by punching the film to provide a perforation thereon, and superposing the starting position on a support medium on the perforation on the film in the initial stage of the exposing procedure. The locational information can be represented by a combination of the migration distance ($Y_n'$) from the starting position of the resolution which is given by calculation according to the subtraction equation $\{Y_n - Y_O = Y_n'\}$ and the signal level at its position, namely ($Y_n'$, $Z_n$).

The relative amount of the radioactively labeled substance can be determined from, for instance, the integrated value in the vicinity of the maximum point or differently calculated values as well as from the signal level at the above-mentioned sampling point.

The signal on the autoradiograph having the information on one dimensional location of the radioactively labeled substances can be output from the signal processing circuit 10 in the form of the above-mentioned numeral values. It should be understood however that the one dimensional information on the location of the radioactively labeled substances given in the form of the coordinate of the sampling point $S_n$ and the signal level at its coordinate ($X_a$, $Y_n$, $Z_n$) can be represented by other optional representation modes.

Thus, the one dimensional information can be obtained in the form of symbol, numeral or combination thereof.

Thus obtained symbol and/or numeral are transmitted to a recording device (not shown), directly or optionally via storage in a storing means such as a magnetic tape.

Various recording devices based on various systems can be employed for the above described purpose, for instance, a device for visualizing optically by scanning a photosensitive material with laser beam, etc., a display means for visualizing electrically on CRT, etc., a means for printing a radiation image displayed on CRT by means of video printer, and a means for visualizing on heat-sensitive recording material using thermic rays.

Further, an appropriate image processing can be performed for the input digital signal in the signal processing circuit 10, as well as the above-described signal processing for obtaining the locational information on the radioactively labeled substances in the form of symbol and/or numeral. Examples of the image processing include spatial frequency processing, gradation processing, addition averaging processing, reduction processing, and enlarging processing. The digital signal having been subjected to the image processing can be A/D-converted for reproduction (recording).

The present invention also provides a signal processing method in autoradiography of a sample containing groups of radioactively labeled substances which are distributed in the one dimensional direction to form plural rows.

The above-mentioned method resides in a signal processing method in autoradigraphy for obtaining information on one dimensional location of groups of radioactively labeled substances arranged in plural rows and distributed respectively in at least one dimensional direction on a support medium, in the form of symbol, numeral or combination thereof, which comprises a process including:

(1) determining on each of the plural rows one dimensional scanning line for signal processing;

(2) detecting on each of the plural rows sampling points on said scanning line; and (3) comprising and identifying said sampling points detected in the plural rows, said process being applied to digital signal corresponding to an autoradiograph having the locational information on the groups of radioactively labeled substances, said digital signal being obtained by exposing a radiosensitive material to radiation emitted by said groups of radioactively labeled substances on the support medium to record the autoradiograph of the groups of radioactively labeled substances on the radiosensitive material, and reading out said autoradiograph photoelectrically.

The sample used in the above-mentioned process generally comprises a support medium containing groups of radioactively labeled substances, each group being distributed in one dimensional direction, to form plural rows in parallel to each other. The term "parallel" does not necessarily mean the strictly parallel relation in which the above-mentioned plural rows are strictly parallel to each other, and includes a locally parallel or approximately parallel relation.

In particular, the above-mentioned signal processing method in the autoradiography is effectively applicable to analyze the molecular weight, molecular structure and basic unit constitution, or polymeric substances such as protein, nucleic acid, derivatives thereof or cleavage products thereof.

Accordingly, the present invention further provides a signal processing method in autoradiography for determining base sequence of DNA or DNA fragment, employing at least four groups of base specific cleavage products consisting of:

(1) base specific cleavage products including at least guanine specific cleavage products;

(2) base specific cleavage product including at least adenine specific cleavage products;

(3) base specific cleavage product including at least cytosine specific cleavage products; and (4) base specific cleavage product including at least thymine specific cleavage products, which are obtained by specific cleavage of the DNA or DNA fragment which has been labeled with a radioactive element, and resolved respectively in one dimensional direction to form resolved rows on a support medium, which comprises a process including:

(1) determining on each of the resolved rows one dimensional scanning line for signal processing;

(2) detecting on each of the resolved rows sampling points on said scanning line; and (3) comparing and identifying the positions of said sampling points on the scanning lines among the resolved rows to obtain locational information on guanine, adenine, thymine and cytosine, said process being applied to digital signal corresponding to an autoradiograph having the locational information on the groups of radioactively labeled cleavage products, said digital signal being obtained by exposing a radiosensitive material to radiation emitted by said groups of radioactively labeled cleavage products on the support medium to record the autoradiograph of the groups of radioactively labeled cleavage products on the radiosensitive material, and reading out said autoradiograph photoelectrically.

An embodiment of the signal processing in the autoradiography utilizing the signal processing method of the present invention will be described referring to a determination of base sequences of DNA.

DNA is in the form of double helix structure consisting of two chain molecules and the two chain molecules are constituted by four constitutional base units, each unit having a base, namely adenine (A), guanine (G), thymine (T), or cytosine (C). The two chain molecules are cross-linked by hydrogen bonding between the four constitutional base units, and the hydrogen bonding between each base comprises only two combinations, namely G-C and A-T. Therefore, if the base sequence of one chain molecule is determined, that of the other chain molecule is automatically determined.

As a representative method for determining the base sequence of DNA utilizing the autoradiography, Maxam-Gilbert method has been known. In this method, a group containing a radioactive isotope of phosphorus (P) is attached to a chain molecule of DNA or a DNA fragment at one end to be sequenced to prepare a radioactively labeled DNA molecule, and then the radioactively labeled DNA molecule is specifically cleaved at the specific constitutional base unit by a certain chemical reaction. This reaction is called a "base specific cleavage reaction". Then the obtained mixture of numerous cleavage products of the DNA or DNA fragment is resolved through gel electrophoresis to give resolved pattern of the numerous cleavage products (the pattern is not visible).

In the procedure, an X-ray film is exposed to the resolved pattern and developed to obtain a visualized autoradiograph thereon, and the sequential position of each base from the radiosotopically labeled end of the chain molecules is read by referring both the obtained autoradiograph and the applied base specific chemical reaction so as to determine the sequence of all bases in the aimed substance.

The signal processing method for the determination of base sequence of DNA or its derivative, fragment, etc., will be described by an embodiment utilizing the above-mentioned Maxam-Gilbert method, referring to the case of employing the following four groups of base specific cleavage products as a typical combination of base specific cleavage product groups:

(1) guanine (G) specific cleavage products,
(2) guanine (G) specific cleavage products + guanine (A) specific cleavage products,
(3) thymine (T) specific cleavage products + cytosine (C) specific cleavage products, (4) cytosine (C) specific cleavage products.

The DNA is radioactively labeled with $^{32}P$ and the radioactively labeled DNA is subjected to the specific cleavage reaction for each base (constitutional unit of DNA), to prepare the above-mentioned four groups of base specific cleavage products. The four groups of specific cleavage products are then resolved on a gel support medium through electrophoresis to obtain a sample. Then, the sample (support medium) is placed on a radiosensitive material together in layers at a low temperature ranging from $-70°$ C. to $-90°$ C. for several days to perform the exposure, and the autoradiograph of the sample is recorded on the radiosensitive material as a visual image.

Figure 4:
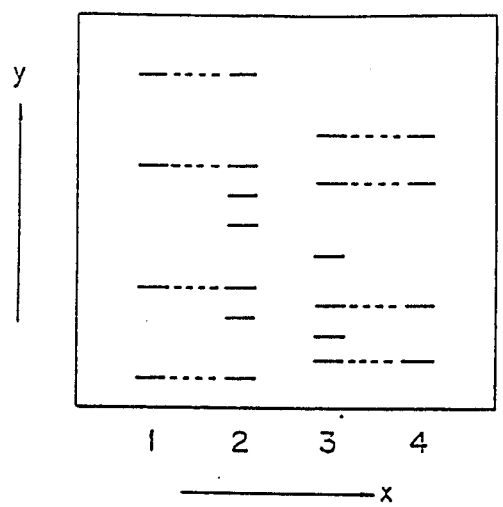
FIG. 4 shows an example of autoradiograph of a sample in which base specific cleavage products of DNA are resolved on a gel support medium.

FIG. 4 schematically shows an autoradiograph of electrophretically resolved pattern consisting of the above-mentioned four groups of radioactively labeled base specific cleavage products. That is, rows of from the first to fourth shown in FIG. 5 in order correspond to:

(1)-(G) specific cleavage products,
(2)-(G) specific cleavage products+(A) specific cleavage products,
(3)-(T) specific cleavage products+(C) specific cleavage products,
(4)-(C) specific cleavage products.

The radiosensitive material on which the autoradiograph is recorded, then installed in the read-out system shown in FIG. 1 to carry out the read-out procedure, and the digital signal corresponding to the autoradiograph is obtained.

The obtained digital signal is subjected to the digital signal processing in the signal processing circuit 10 as mentioned above.

In the first step, the scanning line for the signal processing for the four rows given in the autoradiograph is respectively determined by the digital signal processing in the same manner as aforementioned. For instance, a line passing over the X-coordinate ($X_a$) and being parallel to Y-axis is assigned to the scanning line for each row, wherein a is a positive integer and represents the number of each row.

In the second step, all points at which the signal exhibits a maximum level are assigned to sampling points for detection in the same manner as described hereinbefore. Thus, the sampling point $S_{an}$ having a coordinate and a signal level at its coordinate ($X_a$, $Y_{an}$, $Z_{an}$) is determined for each row, wherein n is an integer and represents the number of each sampling point.

In the third step, the above-mentioned four rows are rearranged. That is, using the first row having the sampling points $S_{1n}$ represented by ($X_1$, $Y_{1n}$, $Z_{1n}$) and the second row having the sampling points $S_{2n}$ represented by ($X_2$, $Y_{2n}$, $Z_{2n}$), the following calculation is done:

$$\{Y_{1n}\} \Omega \{Y_{2n}\} = \{Y_{5n}\}$$

to form a new set of $\{Y_{5n}\}$ according to the fact that a set of Y coordinates $\{Y_{1n}\}$ of the sampling points in the first row is included in a set of $\{Y_{2n}\}$ of the sampling points in the second row. Then, using this set of Y coordinates and the signal levels corresponding thereto, an imaginary fifth row having sampling points $S_{5n}$ represented by ($Y_{5n}$, $Z_{5n}$) is obtained. The obtained fifth row has the locational information only on adenine (A). The same calculation as mentioned above are performed between the third row having the sampling points $S_{3n}$ represented by ($X_3$, $Y_{3n}$, $Z_{3n}$) and the fourth row having the sampling points $S_{4n}$ represented by ($X_4$, $Y_{4n}$, $Z_{4n}$), to obtain an imaginary sixth row having sampling points $S_{6n}$ represented by ($Y_{6n}$, $Z_{6n}$). The sixth row has the locational information only on thymine (T). Thus, one dimensional information consisting of the following four rows is obtained:

(1)-(G) specific cleavage products
(5)-(A) specific cleavage products
(6)-(T) specific cleavage products
(4)-(C) specific cleavage products.

Figure 5:
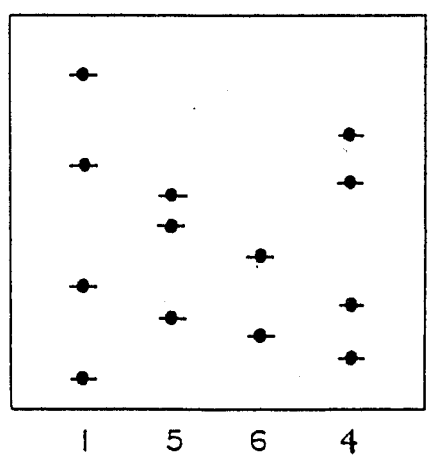
FIG. 5 shows an example of schematic figure showing the base sequence of DNA determined by the signal processing accordance with the present invention.

FIG. 5 illustrates the locational information on the above four rows rearranged through the above calculation.

In the fourth step, these four rows are compared with each other with respect to the position ($Y_{an}$) to arrange the sampling points in the order of from the farthest position to the starting position. For instance, the following scheme is obtained:

$S_{11}, S_{41}, S_{12}, S_{42}, S_{51}, S_{52}, S_{61}, S_{13}, S_{43}, \ldots$ Replacing $S_{an}$ in the scheme according to $S_{1n}=G$, $S_{4n}=C$, $S_{5n}=A$, and $S_{6n}=T$, the following scheme is obtained:

G-C-G-C-A-A-T-G-C- . . . .

Therefore, the base sequence of one chain molecule of DNA can be determined. The representation mode of the obtained information on the base sequence of DNA is by no means limited to the above-mentioned mode, and any other representation mode by be utilized optionally. For instance, the signal level ($Z_{an}$) at the sampling point in the above-mentioned signal processing can be represented as the relative amount of each cleavage product resolved. Otherwise, the illustrative representation as shown in FIG. 5 is also possible.

Furthermore, the base sequence of two chain molecules of DNA can be represented in combination. That is, given the information on the combination between the four bases, namely A-T and G-C, the base sequence of DNA represented by the following scheme is obtained:

G-C-G-C-A-A-T-G-C- . . . .

C-G-C-G-T-T-A-C-G- . . . .

The method for determining the base sequence of DNA utilizing the above-mentioned combination (G, G+A, T+C, C) is an example of the determination of the base sequence of DNA. The signal processing of the present invention is by no means limited to the above-mentioned combination, and various combinations are employable and the base sequence of DNA can be determined by applying thereto the corresponding method in the same manner as described above. For instance, the set or combination (G, A, T, C) can be employed to determine the base sequence of DNA. Otherwise, the combination of at least one group of base specific cleavage products and a suitable reference substance (for example, a mixture of all base specific cleavage products) can be compared to determine the sequence of the specific base.

In the above-mentioned example the present invention was described by using four rows of the radioactively labeled substance groups resolved one-dimensionally on a support medium, but the number of the resolved rows is by no means limited to four, and may be more or less. Further, the base sequence of two or more of DNA can be determined simultaneously using one support medium.

The information on the base sequence of DNA determined through the above-mentioned signal processing is output from the signal processing circuit 10, and can be subsequently recorded using the above-mentioned recording devices or the like.

It is further possible to perform the processing for genetic philological information such as comparison processing between the obtained base sequence of the DNA and the base sequence of another DNA which has been already recorded and stored in a suitable place.

We claim:

1. A signal processing method in autoradiography employing a radiosensitive material for obtaining information on one dimensional location of radioactively labeled substances distributed in at least one dimensional direction on a support medium, in the form of symbol, numeral or combination thereof, comprising the steps of:
(1) obtaining a digital signal corresponding to the autoradiograph on said radiosensitive material by exposing said radiosensitive material to radiation emitted by said radioactively labeled substances on said support medium,
(2) determining one dimensional scanning line relative to said digital signal; and
(3) detecting samling points on said scanning line,
(4) identifying the positions of said sampling points detected on said scanning line among resolved rows for determining the base sequence of labeled substances.

2. The signal processing method in autoradiography as claimed in claim 1, in which all points on said scanning line at which the signal exhibits a maximum level are assigned to sampling points on the scanning line.

3. The signal processing method in autoradiography as claimed in claim 1 or 2, in which said radioactively labeled substances distributed on the support medium are biopolymers, derivatives thereof, or cleavage products thereof, labeled with a radioactive element and resolved on the support medium in one dimensional direction.

4. The signal processing method in autoradiography as claimed in claim 3, in which said bipolymers are nucleic acids, derivatives thereof or cleavage products thereof; and said symbol, numeral or combination thereof obtained by said signal processing represents base sequence thereof.

5. A signal processing method in autoradiography employing a radiosensitive material for obtaining information on one dimensional location of groups of radioactively labeled substances arranged in plural rows and distributed respectively in at least one dimensional direction on a support medium, in the form of symbol, numeral or combination thereof, comprising the steps of:
(1) obtaining a digital signal corresponding to the autoradiograph on said radiosensitive material by exposing said radiosensitive material to radiation emitted by said radioactively labeled substances on said support medium;
(2) determining on each of the plural rows one dimensional scanning line relative to said digital signal;
(3) detecting on each of the plural rows sampling points on said scanning line; and
(4) comparing and identifying the positions said sampling points detected in the plural rows on said scanning lines among resolved rows for determining the base sequence of labeled substances.

6. The signal processing method in autoradiography as claimed in claim 5, in which all points on said scanning line at which the signal exhibits a maximum level are assigned to sampling points on the scanning line.

7. The signal processing method in autoradiography as claimed in claim 5 or 6, in which said comparing and identifying of the sampling points are performed by numerical calculation on the positions of sampling points on the scanning lines among the plural rows.

8. The signal processing method in autoradiography as claimed in claim 5 or 6, in which said groups of radioactively labeled substances distributed on the support medium are biopolymers, derivatives thereof, or cleavage products thereof, labeled with a radioactive element and resolved on the support medium in one dimensional direction.

9. The signal processing method in autoradiography as claimed in claim 8, in which said bipolymers are nucleic acids, derivatives thereof or cleavage products thereof; and said symbol, numeral or combination thereof obtained by said signal processing represents base sequence thereof.

10. A signal processing method in autoradiography for determining base sequence of DNA or DNA fragment, employing radioactively labeled cleavage products obtained by specifically cleaving the DNA or DNA fragment labeled with a radioactive element, comprising the steps of:

(1) providing at least four groups of base specific cleavage products consisting of:
guanine specific cleavage products, adenine specific cleavage products, thymine specific cleavage products and cytosine specific cleavage products;
and resolved respectively in one dimensional direction to form resolved rows on a support medium, (2) obtaining a digital signal corresponding to the autoradiograph on said radiosensitive material by exposing said radiosensitive material to radiation emitted by said radioactively labeled substances on said support medium (3) determining on each of the resolved rows one dimensional scanning line relative to said digital signed;

(4) detecting on each of the resolved rows sampling points on said scanning line; and (5) comparing and identifying the positions of said sampling points on the scanning lines among the resolved rows to obtain locational information on guanine, adenine, thymine and cytosine.

11. The signal processing method in autoradiography as claimed in claim 10, in which said groups of base specific cleavage products of DNA or DNA fragment include at least four groups consisting of:

(1) guanine specific cleavage products;
(2) quanine specific cleavage products and adenine specific cleavage products;
(3) cytosine specific cleavage products; and
(4) cytosine specific cleavage products.

* * * * *